Feb. 15, 1955  J. D. KINSELLA  2,702,246
METHOD FOR PREPARING UNPOPPED POPCORN KERNELS
FOR POPPING, AND THE PRODUCT THEREOF
Filed Nov. 13, 1952
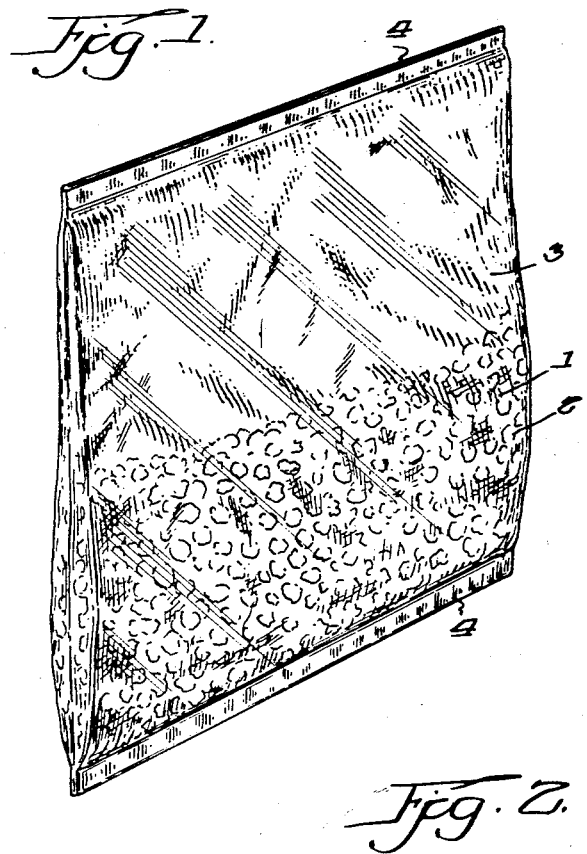
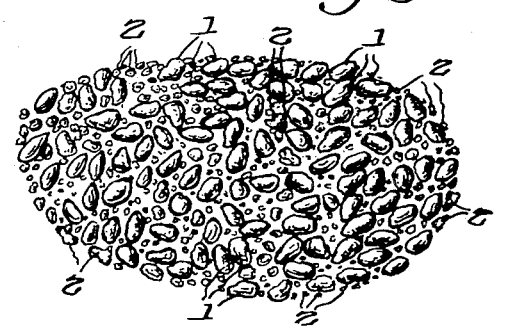
Inventor.
James D. Kinsella.
By W. J. Kellogg  Atty

United States Patent Office 2,702,246
Patented Feb. 15, 195

2,702,246

METHOD FOR PREPARING UNPOPPED POPCORN KERNELS FOR POPPING AND THE PRODUCT THEREOF

James D. Kinsella, St. Paul, Minn.

Application November 13, 1952, Serial No. 320,189

11 Claims. (Cl. 99—81)

This invention relates to improvements in prepared and packaged foodstuff mixtures and has for an object to provide a novel food admixture, the ingredients of which are packaged in such pre-measured relation that the same may be poured or otherwise removed, in bulk, from the package into a cooking container, and thereupon, cooked or prepared for consumption, and when so prepared, will be most palatable because of its correctly proportioned ingredients.

It is also an object of the invention to provide a packaged pre-measured multi-ingredient foodstuff which may be effectually and satisfactorily prepared for consumption with but a minimum of effort and in a like period of time.

Another object of the invention is to provide a multi-ingredient foodstuff which will be preserved in a state of maximum freshness over a prolonged period of time, thus ensuring the presence of its taste pleasing and satisfying characteristics when prepared for consumption, particularly so, by reason of the prevention of enzymatic reaction in certain of its ingredients.

More specifically, it is an object of my invention to provide a popcorn admixture package in which correctly proportioned amounts of unpopped kernels of corn and of solidified vegetable fat are contained in a single pre-admixed product and retained in fresh and pleasingly edible form until such time as said product is removed from its package, heated, and so, prepared for consumption.

I am well aware that heretofore, packaged popcorn products have been prepared and marketed with some degrees of success. Certain of such products consist of separately packaged pre-measured and proportioned amounts of popcorn kernels, liquid oil, and seasoning, all retained in a common receptacle; others of admixed quantities of unpopped popcorn kernels and liquid oil contained in an evacuated receptacle, and still others, of quantities of unpopped popcorn kernels and semi-solid (pourable) oil in an evacuated container. Another thereof consists of a body of solidified edible oil in which a pre-measured amount of unpopped popcorn kernels are embedded or suspended.

As regards the liquid oil and semi-solid oil component products, because of the manners of their packaging, the cost of the same is undesirably high, the ultimate saturation of the kernels with the liquid or semi-solid oil deteriorates the same to a point of unacceptability, also, the step-by-step opening and subsequent admixing of the product ingredients is time absorbing. The last mentioned product, while capable of being wholly placed in a receptacle for heat preparation, is unsatisfactory to a point of purchase refusal because (1) enzymatic reaction occurs in the solidified edible oil making the same rancid and substantially unfit for consumption; (2) the time required to heat prepare the product for consumption is prohibitively long, hence, objectionable, and (3) the unpopped kernels retained in the solidified edible oil are frequently scorched or burned during heating preparation of the product, and so, rendered unpalatable.

The above noted disadvantages and faults are eliminated by and from my improved product. In point with such claim, it may be stated that the product of my invention is capable of (a) being produced at a minimum of cost; (b) being hermetically contained in and dispensable from a single economically expendable package, thereby further improving its cost economies and rendering it most desirably advantageous and convenient for marketing, sales displaying and using; (c) retaining its original form and taste properties and freshness; (d) being heat treated for consumption in a period of time considerably less than that required to similar prepare kindred prior products; (e) being heat treated to a degree sufficient to effect popping without burning or scorching of the kernels and/or the fat component and (f) avoiding the occurence of hydrolytic action or like decomposition of the pre-measured and admixed ingredients thereof.

The foregoing, as well as other objects, advantages and meritorious teachings of my invention, will be in part obvious and in part pointed out in the following detailed disclosure thereof when taken in conjunction with the accompanying drawings, it being understood that the form of the invention presented herein is precise and what is now considered to be the best mode of embodying its principles, but that modifications and changes may be made in specific embodiments without departing from its essential features.

In the drawings:

Figure 1 is a perspective view of a satisfactory form of package containing my improved product, and Figure 2 is an enlarged detail in elevation of my improved product per se, showing the manner in which the flaked solidified vegetable fat is distributed with relation to or between the unpopped popcorn kernels when the same are packaged, and also, when they are dispensed from the package and deposited onto a heating surface.

The invention, in its accomplishment, involves meritorious method of preparing unpopped popcorn kernels for popping, and the product of that method.

The product, per se, as illustrated in Figure 2 of the accompanying drawings, is comprised of a preferred grade of unpopped popcorn kernels or raw popcorn kernels 1 and a flaked (solidified) synthetic vegetable fat 2. The corn kernels 1 and the flaked vegetable fa 2 are comingled or admixed (see Figure 2) whereby when and as being heat treated to effect popping of th corn kernels, the flakes will be distributed bodil throughout and between the same. Thus, when th flakes are heated and melted, as when contacted wit a sufficiently heated admixture receiving surface, th latter will be overall filmed or covered with the the liquid vegetable fat, and at the same time, the raw cor kernels will be effectually, evenly and thoroughly sub jected to and impregnated therewith. Consequently said kernels will be ensured of individual popping t maximum and more or less uniform size; of being ren dered bodily tender and yet crisp, and flavorfully tast enhanced (seasoned); all being accomplished withou the hazard of burning, scorching or similar product de terioration or spoilage.

A satisfactory embodiment of the improved produc admixture is the following: Unpopped popcorn kernel (by weight), approximately sixty six and two-third (66⅔%) percent; and flaked (solidified) vegetable fa (by weight), approximately thirty three and one-third (33⅓%) percent.

Weight percentages of the admixture ingredients, a above set forth, may vary somewhat within the purview or spirit of my invention, but not materially, withou detrimentally affecting the meritorious qualities of the product thereof.

Admixing of the ingredients of the product can, o course, be effected manually or mechanically. It is de sirable, however, that such admixing shall be done with a minimum of breakage or disintegration of the flakec or solidified vegetable fat and without damaging the raw popcorn kernels, particularly, their thin skinlike coverings or husks.

Following the admixing of the aforesaid product ingredients, said product is hermetically packaged. Different yet satisfactory forms of packages may be employed. The size of the packages may vary, i. e. amounts of the product suitable for individual servings of the ultimately popped popcorn may be packaged, or relatively greater amounts thereof may be packaged, such as conditions or preference may dictate. Also, it is to be understood that the package is of such material, institution, and/or form as to be economically expandable following the emptying of its contents therefrom.

One satisfactory form of package of the product is shown in Figure 1 of the drawings. Herein, an amount of said product is introduced into a sleeve-like body of film or sheet plastic 3. Thereupon, the opposite ends of the body are closed, usually by heat sealing, as at 4, or other methods well known and practiced in the art of foodstuff packaging. There results a more or less flat package of advantageous and conveniently handleable, shippable and displayable qualities. The package material being impervious to air or other fluids, hermetically seals the product therein, preventing deterioration of the same and ensuring preservation of its freshness and other inherent properties over a prolonged period of time.

To use my improved product, i. e., prepare it for consummation, the containing package is so opened, as by cutting or tearing, that its contents may be poured therefrom onto a sufficiently heated receiving surface, such as the bottom of a corn popping pan, etc. Being thus dispensed, the package may be disposed of.

The flaked solidified vegetable fat of the product admixture being distributed or dispersed more or less evenly over the heated receiving surface, will be rapidly wholly melted and converted to liquid or oil consistency. Because of its dispersal over said surface, the now liquid vegetable fat or oil will quickly cover the same. At the same time, it will contact the raw popcorn kernels. Thereby, the kernels will be overall contacted by the hot liquid vegetable fat or oil. Thus contacted, they will be so impregnated with the oil as to be most flavorfully taste enhanced or seasoned, especially, when popped. Furthermore, the individual raw kernels impregnated with the heated oil will be materially accelerated in their popping or exploding in that the natural moisture thereof will be much more rapidly converted to gas or steam. Thus accelerated, popping of the individual kernels will be more or less collectively effected. The result of this accelerated and substantially collective popping of the oil impregnated and heated kernels, by reason of the internal pressure or force of the gases or steams generated therewithin, will effect a maximum and substantially uniform dilation or expansion of said kernels when popped. In consequence, the resulting or ultimate popped corn will be of a most desirable tender and crisp texture, rendering it much more pleasing to taste and consumption. Moreover, the end product of the popping or heat treatment, as described above, will be substantially free from culls and/or unpopped or partially popped kernels, and the presence of scorched or burned kernels (either popped, partially popped or unpopped) in said end product due to overly long contact with heat, will be substantially if not entirely eliminated.

If wanted, additional seasoning or flavoring may be imparted to the popped corn by admixing the same, in required proportions, to the mixture, as to or with the flaked solidified vegetable fat.

The unpopped corn, as and while being admixed with the flaked vegetable fat, and when and while packaged in its admixed state, will not be contacted by such vegetable fat in oil form due to the constantly maintained solidity thereof. Consequently, the corn kernels will be prevented from becoming saturated, soggy and damaged, and because thereof, will retain their original moisture content and freshness. It is also of importance to proper keeping qualities of the product of my invention that because the solidified flaked fat or oil is loosely distributed between and around the raw popcorn kernels, the flakes have or make an absolute minimum of contact with said kernels. Hence, an absolute minimum of contact of oil to kernels results. This leaves free or void interstices between the flakes and kernels. Thereby, the detrimental action of hydrolysis is greatly lessened, if not eliminated. Consequently, the period of satisfactory shelf-life of the product is materially increased or prolonged far beyond the period of shelf-life of previous products of similar character.

The flaked solidified vegetable fat, it should be noted, has a comparatively low melting point; it melts quickly and completely, in marked contradistinction to being gradually or slowly meltable when subjected to heat. Hence, the need for prolonged or comparatively prolonged periods of heating to effect melting of said flaked vegetable fat is obviated, and thereby, as will be readily appreciated by workers skilled in this art, the hazard of overheating, burning, and/or scorching the raw corn kernels during their heat treatment for popping will be greatly and beneficially reduced, if not eliminated. Furthermore, because the solidified vegetable fat flakes are well comingled with and dispersed throughout and between the raw popcorn kernels of the admixture, they will be more or less evenly distributed over a heated or other receiving surface when poured thereonto from their opened package. They will have maximum areal contact with such surface. Therefore, when this surface is heated, a materially increased rate or speed of melting of the same will result. Such an accelerated melting will, as above inferred, quicken the popping of the raw popcorn kernels of the admixture. At the same time, the quickened period will be entirely sufficient to impregnate the corn kernels with the now liquified vegetable fat whereby to season, and so, enhance the flavor or taste of the popped product; also, to ensure, as heretofore described, dilation or expansion of the individual kernels to maximum and, generally, uniform size.

I claim:

1. A method of preparing unpopped popcorn kernels for popping and preserving the same, which consists of admixing a pre-measured and predetermined quantity of unpopped popcorn kernels with a pre-measured and predetermined relatively proportioned quantity of solid flakes of vegetable fat, and hermetically packaging the same.

2. A method of preparing unpopped popcorn kernels for popping and preserving the same, which consists of admixing an amount of unpopped popcorn kernels with a predetermined relatively proportioned amount of flaked solid vegetable fat.

3. A method of preparing unpopped popcorn kernels for popping and preserving the same, which consists of admixing an amount of unpopped popcorn kernels with a predetermined relatively proportioned amount of flaked solid vegetable fat having a low and sharply effectable melting point.

4. A method for preparing unpopped popcorn kernels for popping and preserving the same, which consists of admixing approximately sixty six and two-thirds percent (66⅔%) unpopped popcorn kernels with approximately thirty three and one-third percent (33⅓%) flaked vegetable fat, and hermetically packaging the same.

5. A method for preparing unpopped popcorn kernels for popping, which consists of admixing approximately sixty six and two-thirds percent (66⅔%) unpopped popcorn kernels with approximately thirty three and one-third percent (33⅓%) flaked solidified vegetable fat.

6. An edible prepared product, comprising unpopped popcorn kernels and flaked vegetable fat.

7. An edible prepared product, comprising unpopped popcorn kernels and flaked vegetable fat, the proportionate amount of the unpopped popcorn kernels being greater than that of the flaked vegetable fat.

8. An edible prepared product, comprising unpopped popcorn kernels and flakes of solidified vegetable fat dispersed therebetween.

9. An edible prepared product comprising approximately sixty six and two-thirds percent (66⅔%) unpopped popcorn kernels and approximately thirty three and one-third percent (33⅓%) flaked solidified vegetable fat, and the admixture being hermetically confined.

10. An edible prepared product, comprising unpopped popcorn kernels and flaked solidified vegetable fat having the characteristics of rapid meltability and a low melting point.

11. A packaged edible prepared product, comprising unpopped popcorn kernels, and flakes of solidified fat dispersed about and between the kernels, effecting void interstices between the same and said kernels.

References Cited in the file of this patent

UNITED STATES PATENTS

| | | |
|---|---|---|
| 2,518,247 | Nairn | Aug. 8, 1950 |
| 2,604,407 | Martin | July 22, 1952 |